March 11, 1952 G. S. RALSTON 2,589,136
APPARATUS FOR WATER TREATMENT
Filed May 21, 1949 2 SHEETS—SHEET 1
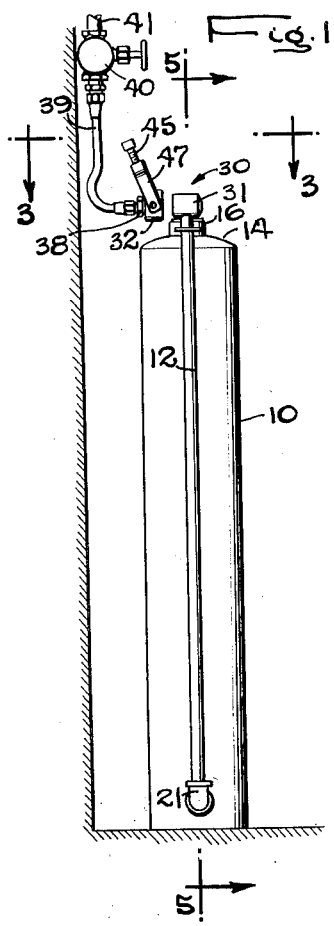
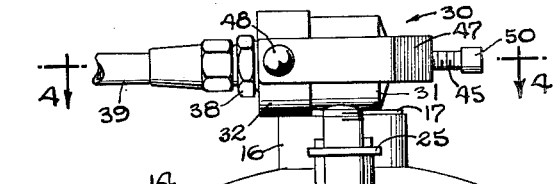
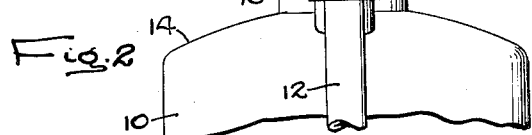
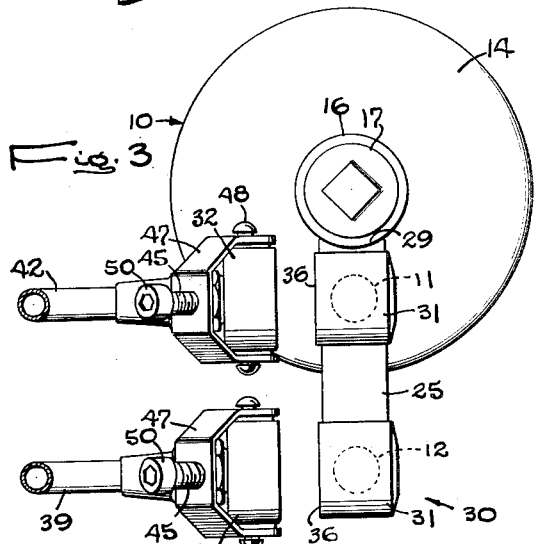
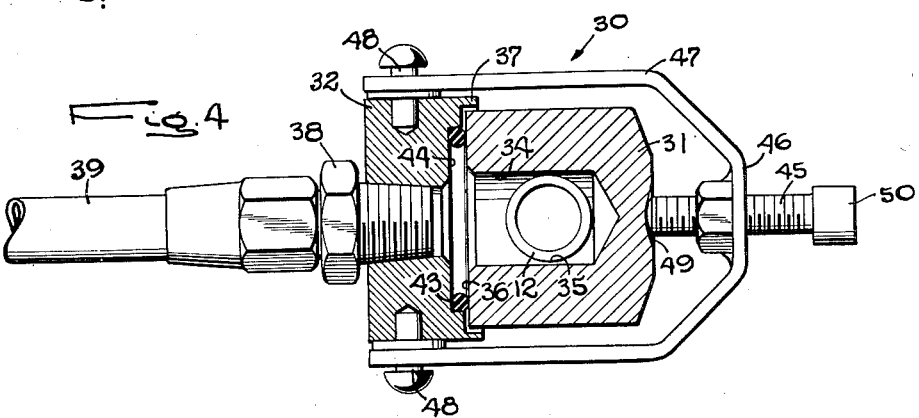
INVENTOR
Glenn S. Ralston
By Carlson, Pitzner, Hubbard & Wolfe
ATTORNEYS March 11, 1952  G. S. RALSTON  2,589,136
APPARATUS FOR WATER TREATMENT
Filed May 21, 1949  2 SHEETS—SHEET 2
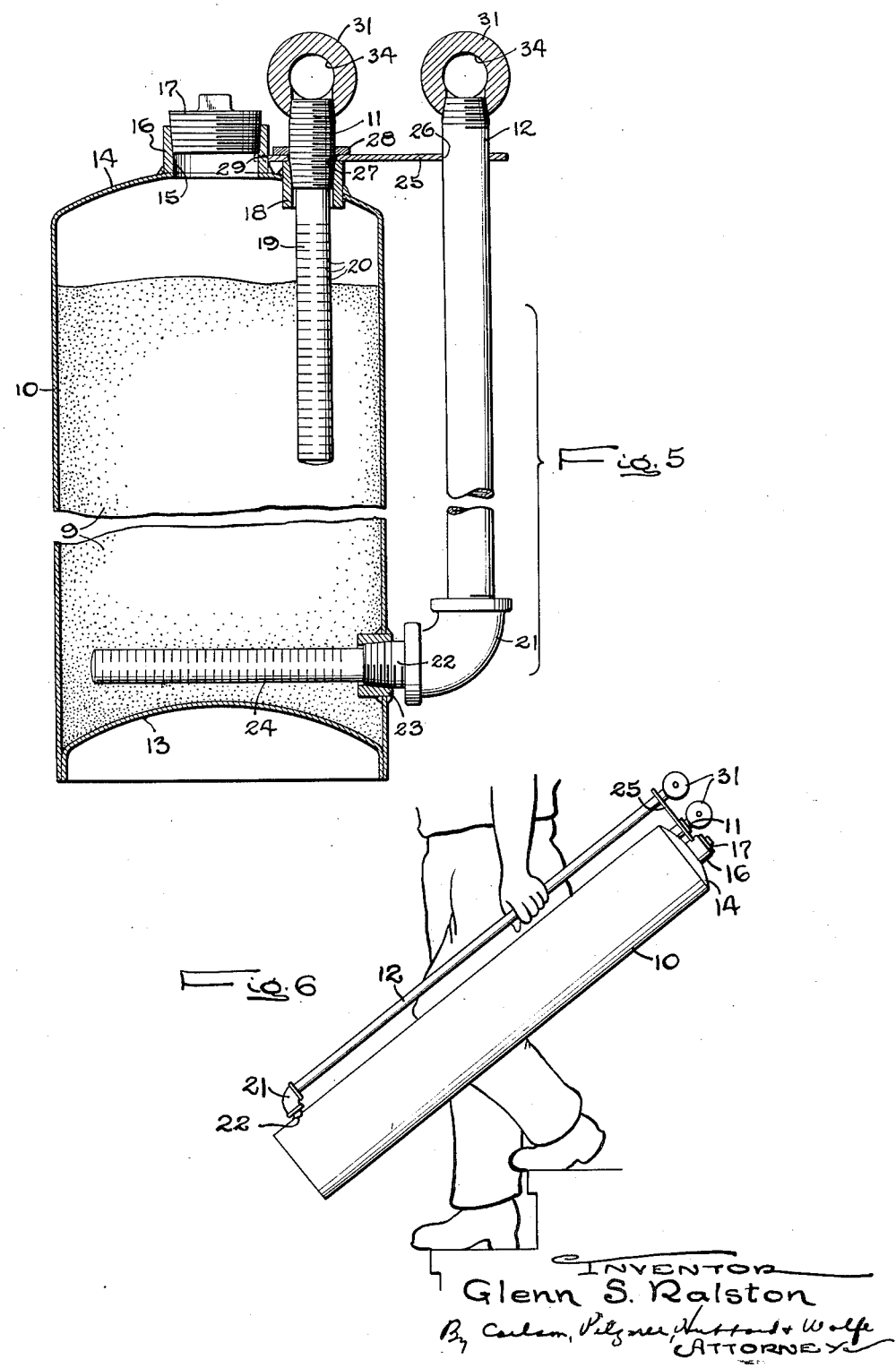
INVENTOR
Glenn S. Ralston Patented Mar. 11, 1952

2,589,136

UNITED STATES PATENT OFFICE 2,589,136

APPARATUS FOR WATER TREATMENT

Glenn S. Ralston, Rockford, Ill., assignor to Servisoft, Inc., Rockford, Ill., a corporation of Illinois Application May 21, 1949, Serial No. 94,597

2 Claims. (Cl. 210—24)

This invention relates to apparatus such as water softeners for treating water by passing the same through an ion-exchange mineral and has more particular reference to softeners which are adapted for quick detachment from or connection with the supply and service lines of water systems in different households or other locations.

The general object is to provide a tank unit for the above purpose which, as compared to prior softener units, is substantially lighter in construction for a given softening capacity, which is simple and inexpensive to construct, which may be disconnected and removed from a water installation in a substantially shorter time, which facilitates removal and replacement of the mineral, and which may be replaced in another installation in an equally short time.

Another object is to mount one of the water pipes alongside the mineral tank and secure the same to the tank so that the pipe itself may be utilized as a handle for transporting the tank while holding the same at various angles as may be desired in service use.

A further object is to provide fittings on the inlet and outlet pipes constructed and arranged in a novel manner to facilitate quick connection or detachment of the unit, to avoid spilling of the water flowing from the fittings upon breaking of the connection therebetween, and to minimize the labor incident to connection and disconnection of the unit.

A more detailed object is to construct the connecting fittings on the tank and the adjacent water pipes so that the mating parts may be brought into and out of engagement by a simple horizontal movement of the tank.

Other objects and advantages of the invention will become apparent from the following detailed description taken in connection with the accompanying drawings, in which Figure 1 is an elevational view of the improved softener and associated pipe connections with the latter disconnected from the tank.

Fig. 2 is a fragmentary elevational view with the parts connected.

Fig. 3 is a plan view taken along the line 3—3 of Fig. 1.

Fig. 4 is a section taken along the line 4—4 of Fig. 2.

Fig. 5 is a fragmentary sectional view taken along the line 5—5 of Fig. 1.

Fig. 6 is a side view illustrating the manner of transporting the softener.

The water softener shown in the drawings for purposes of illustration comprises an elongated generally cylindrical tank 10 having rigid therewith inlet and outlet pipes 11 and 12 respectively communicating with the top and bottom portions of the tank. The latter is closed at its lower end by a bottom plate 13 and at the top by a dome 14 having an opening 15 of sufficient size to permit the introduction of regenerated granular exchange mineral 9 or removal of the spent mineral for regeneration of the latter in a separate container. Herein, the opening 15 is formed by a cylindrical flange 16 rigid with and projecting outwardly from the top 14 preferably at the center thereof and internally threaded to receive a screw plug 17.

The inlet 11 through which raw water is delivered to the tank comprises a short pipe or nipple substantially smaller in diameter than the flange 16 and screwed into a coupling flange 18 which is welded in and projects through the top plate 14 parallel to the axis of the tank and laterally spaced outwardly from the flange 16. For a purpose to appear later, the coupling flange 18 projects from the tank top a distance somewhat less than the center flange 16. A strainer 19 is received at one end in and secured to the inner end of the nipple 11 and formed along its length with saw cuts 20 which constitute the strainer openings.

In accordance with one aspect of the present invention, the outlet 12 is formed by an elongated straight pipe which communicates with the bottom portion of the tank and extends along substantially the full length of the tank from which the pipe is spaced so that any portion thereof along its length may be utilized as a handle for enabling the softener to be transported with the tank disposed at any desired angle. To connect the pipe detachably to the lower end of the tank, one threaded end thereof is screwed into an elbow 21 threaded onto the outwardly projecting end of a short nipple 22 which is screwed into a coupling 23 projecting through and welded into the side wall of the tank. A strainer 24 of the same construction as the upper strainer 19 is secured to the inner end of the nipple 22 and projects horizontally and substantially across the full width of the tank a short distance above the bottom plate 13.

A novel but readily detachable means is provided for securing the upper end of the outlet pipe 12 rigidly to the tank. This means comprises a flat bar 25 apertured at 26 near one end to receive the pipe 12 and intermediate its ends at 27 to fit over the outwardly projecting end portion of the nipple 11 and abut against the end of the coupling flange 18 against which the bar may be clamped by a nut 28. At its inner end, the bar 25 is recessed as indicated at 29 (Fig. 3) to fit at least partially around and lie in abutment with the side of the center flange 16. By virtue of this engagement, the bar is held against swinging about the nipple 11 as a fulcrum and therefore the outer end is held rigid with respect to the tank. At the same time, the outlet pipe may be removed easily to permit cleaning or replacement of the strainer as may be required occasionally in service use. This is accomplished by first unscrewing the fittings on the outer ends of the pipes 11 and 12 and removing the nut 28 after which the bar 25 may be removed to permit the pipe 12 to be turned and the nipple 22 to be unscrewed and removed from the tank along with the strainer 24. The strainer 19 may be removed in a similar way.

The invention also contemplates the provision of couplings 30 which enable the softener unit to be connected quickly in a water supply system, to maintain a tight leak-proof connection, and to be detached readily and removed from the system when it becomes necessary to regenerate the softening mineral. Each coupling comprises a hollow head 31 of simple and rugged construction adapted to mate with a coacting element 32 mounted on a pipe of the water system and carrying a simple and easily operable device for clamping the two coupling elements together in firm sealing engagement.

In the present instance, the coupling element 31 comprises a cylindrical block axially drilled to form a recess 34 (Fig. 4) which intersects a hole 35 drilled in the side of the block and threaded to screw onto the outer threaded end of either of the pipes 11 and 12. With the element thus mounted, the recess 34 is disposed horizontally and terminates at a flat vertical surface 36 at one end of the block. This end of the block is adapted to be received loosely within a cylindrical flange 37 on one end of the other coupling element 32 which takes the form of a ring internally threaded to screw onto a standard fitting 38 on the end of a copper or other flexible pipe 39 leading through a manually operable valve 40 to a service pipe 41 through which water treated by the softener is delivered to the household utilities. In a similar way, the element 32 of the other or inlet coupling 30 is connected to a flexible tube 42 leading a pipe not shown through which raw water to be treated is supplied to the softener. When one of the coupling heads 31 is received within the flange 37 of the associated element 32, the flat end surface 36 abuts against the projecting surface of a resilient gasket or O ring 43 which is seated in a counterbored recess 44 surrounding the hole in the ring 32.

Clamping of the head 31 tightly against the gasket 43 is effected by tightening a screw 45 threading through the closed end 46 of a U-shaped yoke 47 whose legs are pivoted on headed pins 48 projecting horizontally and outwardly from diametrically opposite sides of the coupling ring 32. The yoke is long enough to swing from the upright or released position shown in Fig. 1 downwardly and horizontally over the coupling head 31 when the latter is in abutment with the gasket 43. In such horizontal position of the yoke, the inner rounded end of the screw 45 is alined with a depression 49 (Fig. 4) in the closed end of the coupling head 31. Then, upon tightening of the screw by a tool applied to the head 50 thereof, the yoke is placed under tension which draws the coupling elements 31 and 32 together compressing the gasket 43 between them to form a watertight seal. Disconnection of the coupling is effected simply by loosening the screw 45 a few turns and swinging the yoke upwardly and out of the way as shown in Figs. 1 and 3.

In an actual service installation, the combined coupling and clamping elements 31 and 32 are preferably mounted on the horizontally projecting ends of the flexible copper pipes 39 and 42 which usually are disposed to project outwardly from a building wall as shown in Fig. 1. By proper bending of the pipes 39 and 42, the two coupling elements 32 are spaced horizontally to correspond to the spacing of the axes of the mating coupling elements 31 on the tank and are disposed above the floor to aline with the tank elements when the tank is resting on the floor as shown in Fig. 1. With the gaskets 43 thus disposed in a vertical plane, the mating surfaces 36 of the elements of the two pairs may be brought into abutment simply by shifting the tank along the floor. Or, by first locating the bottom of the tank closer to the building wall with the top inclined outwardly at a small angle, the coupling elements may be brought together by tipping the top of the tank toward the wall after an approximate alinement of the parts.

To complete the connection, it is only necessary to swing the clamping yokes 47 forwardly and downwardly into horizontal position to bring the screws 45 into alinement with the depressions 49 in the tank elements 31. Actual clamping is effected simply by tightening the screws. The gasket is thus compressed to the required degree forming a seal which will withstand, without danger of leakage, the pressures normally used in city water systems.

To remove the softener unit, the above procedure is reversed. That is, the screws 45 are loosened to permit the yokes to be swung upwardly out of the way. Then, by simply tipping the top of the tank forwardly or away from the building wall, the elements of the two couplings will be separated permitting removal of the unit and the substitution of another unit containing regenerated mineral.

In the process of detaching the softener unit from or inserting the same in the water system, no flexing or bending of the pipes 39 and 42 is required after their position has first been established. This advantage results from location of the two sealing surfaces 36 side by side and in a vertical plane so that they may be brought into abutment with the coacting surfaces of the gaskets by only a slight horizontal movement of the tank. Such horizontal positioning of the coupling elements is also advantageous in avoiding spilling of water onto the floor in the process of disconnecting the tank. This water which runs down out of the pipes 39 and 42 may be caught in a shallow receptacle held beneath the coupling joints while the connections are being broken. Location of a receptacle to catch this water is made possible by spacing the coupling heads 31 above the upper end of the tank and projecting the outwardly facing ends a short distance beyond the pipes 11 and 12.

Location of the outlet pipe 12 outside of the tank and alongside the latter is advantageous not only in enabling the tank to hold a larger volume of mineral but also in providing an elongated handle, any part of which may be grasped in carrying the softener from place to place. When the handle is gripped near the center, it will be properly balanced when the tank is disposed substantially horizontally. To incline the tank downwardly while it is being carried down a stairway, proper balance may be achieved by grasping the pipe 12 at a point spaced from the center as illustrated in Fig. 6. Or, as is sometimes desirable, the tank may be supported with two hands by grasping the pipe 12 at opposite ends.

Regeneration of the softening mineral is effected outside of the tank from which the mineral, because of its granular character, may be poured through the opening 15 after removal of the plug 17. The tank is refilled with regenerated mineral through the same opening.

I claim as my invention:

1. In a water treating apparatus, the combination of an elongated closed tank, an outlet pipe communicating with and attached rigidly to one end of the tank and extending alongside the tank beyond the other tank end, said pipe being disposed close to but spaced from the tank to receive the fingers of one's hand at different points spaced along the pipe whereby to enable the pipe to be used as a handle in carrying the tank while suspended from the hand at various angles, means joining said tank and said pipe at a point spaced along the tank from said first tank end whereby to hold the pipe end against substantial movement relative to said tank, a short pipe communicating and rigid with said other tank end and projecting from the latter parallel to said first pipe, the projecting ends of the two pipes extending beyond the tank end, and fittings rigid with said pipe ends and providing sealing surfaces disposed substantially in a common plane and facing outwardly away from the tank axis and adapted for abutting engagement and detachable connection with complemental surfaces on inlet and outlet conduits, said fittings having angular passages extending therethrough from said pipes and terminating at openings each disposed within one of said sealing surfaces.

2. In a water treating apparatus, the combination of an elongated closed tank, an outlet pipe communicating with and attached rigidly to one end of the tank and extending alongside the tank to a point adjacent the other tank end, said pipe being disposed close to but spaced from the tank to receive the fingers of one's hand at different points spaced along the pipe whereby to enable the pipe to be used as a handle in carrying the tank while suspended from the hand at various angles, means joining said tank and said pipe at a point spaced along the tank from said first tank end whereby to hold the pipe end against substantial movement relative to said tank, a short pipe communicating and rigid with said other tank and projecting from the latter parallel to said first pipe, and right angular fittings rigid with the projecting ends of said pipes and providing annular sealing surfaces facing outwardly in the same direction away from the tank axis and along parallel axes and adapted for abutting engagement and detachable connection with complemental surfaces on parallel inlet and outlet conduits, said fittings having angular passages extending therethrough from said pipes and terminating at openings each disposed within one of said sealing surfaces.

GLENN S. RALSTON.

REFERENCES CITED

The following references are of record in the file of this patent:

UNITED STATES PATENTS

| Number | Name | Date |
|---|---|---|
| 1,262,763 | Farley | Apr. 16, 1918 |
| 1,649,355 | Lindsay et al. | Nov. 15, 1927 |
| 1,689,308 | Stickney | Oct. 30, 1928 |
| 1,817,691 | Jacobsen | Aug. 11, 1931 |
| 1,958,176 | Zimmerman | May 8, 1934 |
| 2,049,530 | Van Eweyk | Aug. 4, 1936 |
| 2,245,767 | Eickmeyer et al. | June 17, 1941 |
| 2,326,213 | Gorrien | Aug. 10, 1943 |
| 2,370,190 | Ralston | Feb. 27, 1945 |
| 2,394,363 | Bynoe | Feb. 5, 1946 |

FOREIGN PATENTS

| Number | Country | Date |
|---|---|---|
| 338,021 | Great Britain | Nov. 13, 1930 |